Patented Mar. 10, 1942

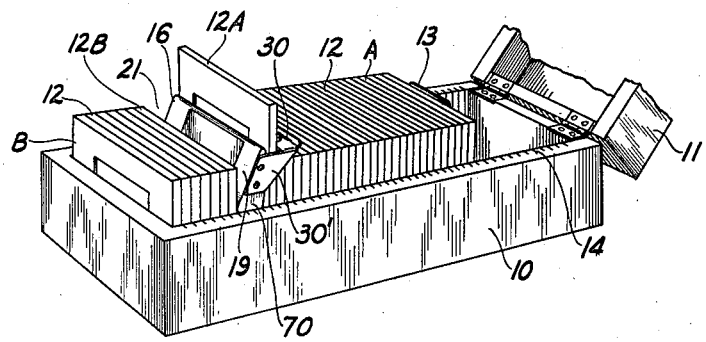
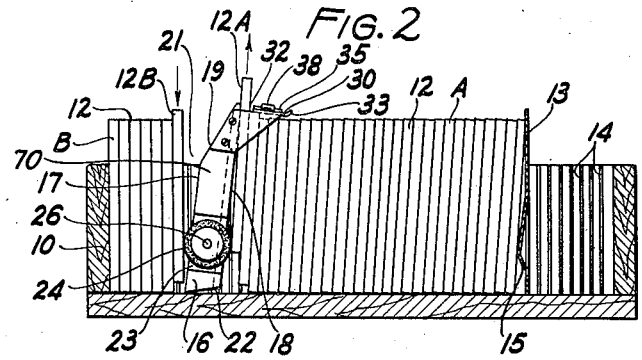
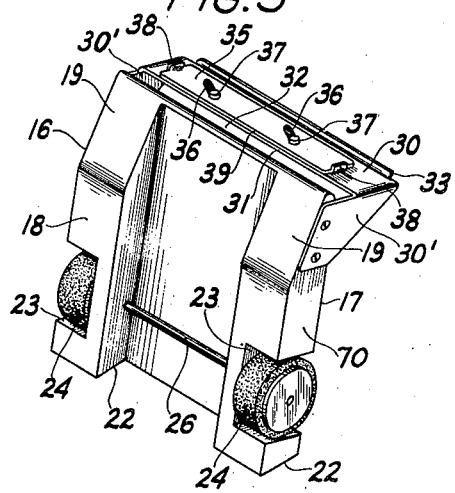
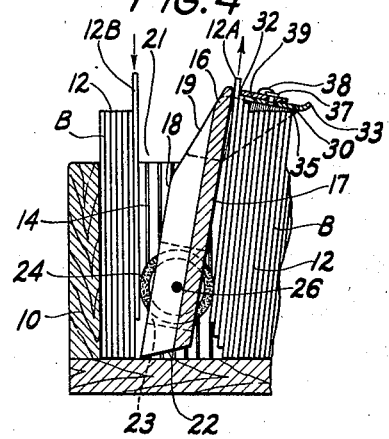

2,275,819

UNITED STATES PATENT OFFICE 2,275,819

PROGRESSIVE SLIDE SEPARATOR

Henry J. Hood, Rochester, N. Y., assignor to Eastman Kodak Company, Rochester, N. Y., a corporation of New Jersey Application November 28, 1940, Serial No. 367,597

5 Claims. (Cl. 312—92)

The present invention relates to a progressive separator whereby the individual slides of a series of sequentially arranged slides can be progressively selected and elevated for removal in the projection operation and returned after use to their proper places in the original sequence, and particularly to a progressive separator which permits the elevation of only one particular slide of a group to be projected in response to the insertion of a previously viewed slide to the projected group of the series.

Progressive slide separators in which the next slide to be projected of a prearranged series is automatically elevated in response to the return of the last slide projected are known. However, due to the fact that the slides are necessarily resiliently held in surface contact at all times these known progressive slide separators possess the disadvantage that instead of only one slide being elevated by the return of another there are two or more slides elevated due to the friction between the same.

One object of the present invention, therefore, is to improve these known progressive slide separators so that only one particular slide will be elevated from a group in response to the return of a previously used slide to another group.

And another object is to provide a progressive separator which confines certain slides of a group to the container holding the same and is provided with an exit slot through which only one particular slide of the group to be projected can be elevated.

And yet another object is to provide a progressive separator of the type set forth, and in which the width of the exit slot can be readily altered to accommodate slides of varying thickness.

The novel features that I consider characteristic of my invention are set forth with particularity in the appended claims. The invention itself, however, both as to its organization and its method of operation, together with additional objects and advantages thereof, will best be understood from the following description of specific embodiments when read in connection with the accompanying drawing in which Fig. 1 is a perspective view illustrating a progressive separator in place in a series of prearranged slides in their container, Fig. 2 is a longitudinal sectional view, partially in elevation, and taken just inside of the side wall of the container of Fig. 1, but excluding the cover of said container, Fig. 3 is a perspective view of the progressive separator constructed in accordance with a preferred embodiment of the present invention, and Fig. 4 is a partial longitudinal section of a slide container with a progressive separator in place therein, and showing thin slides in place in the container, and the exit slot of the separator adjusted to accommodate slides of the thickness shown.

Like reference characters refer to corresponding parts throughout the drawing.

Referring to Figs. 1 and 2, the container, or box, 10 is provided having a hinged cover 11. The box is adapted to contain a series of projection slides 12 which fit loosely within the box and project above the side walls. Any desired number of projection slides 12 may be installed in the box, which can have its storage capacity effectively shortened by means of a partition member 13 comprising a metal plate whose side edges are adapted for insertion in vertically disposed grooves 14 formed in the side walls of the box. Partition member 13 may be provided with a pair of struck out spring ears 15 for engagement with the adjacent slide of the series, said spring ears acting to press the several slides into surface contact with one another.

The progressive separator shown herein is of the type adapted to step, or progress, along the box to separate a series of prearranged slides into a group of slides to be projected and a group of slides which have been projected, the number of slides in the two groups varying as the slides are projected and the separator is moved along the box. The separator is formed to provide a guide opening for the ready return of used slides to the projected group and for automatically elevating the next slide to be projected upon the return of a projected slide to the corresponding group.

As seen in Figs. 1, 2, and 3, the separator 16 is provided with opposite side walls 17 and 18 which are disposed adjacent the group of slides to be projected and the group of projected slides, respectively. The side wall 18 is of less height than the side wall 17 and merges at its upper end with an inclined wall 19 which diverges from the adjacent slide 12 to provide an opening 21 for return of slides after use. The lower ends of the respective side walls 17 and 18 are preferably of different height from the bottom of the box to provide an inclined bottom surface 22 with its lowermost edge adjacent the to be projected slides.

To provide for the automatic elevation of the next slide to be projected upon return of a previously projected slide, the ends of the separator are provided with a recess 23 in which respective rollers 24 are located and project beyond the walls 17 and 18. The rollers 24 may be secured in any convenient manner upon a transverse shaft 26 which is suitably journaled in the end walls of the separator. The rollers 24 may be formed with friction surfaces of any suitable material, for example, rubber.

As seen in Fig. 2, the rollers 24 project beyond the respective side walls 17 and 18 to engage the adjacent slides 12 of the group of slides to be projected A and the projected group of slides B. Upon return of a slide into the group B, for example, as indicated at 12B, the rollers 24 are rotated to in turn effect elevation of the adjacent slide 12A of the group A, in which elevated position the slide can be readily picked up by the operator for use in a projection machine. The above described sequence of operation continues as the slides are successively removed from group A, used, and returned to group B, the separator progressing along the box as the slides are successively removed from group A and returned to group B, with the next adjacent slide of group A being elevated each time by the rollers 24 on return of a slide to group B.

The progressive separator, and all of the features thereof, set forth up to this point are known and do not constitute the present invention. The present invention resides in an important improvement in the described progressive separator to be hereinafter set forth, and which improvement is designed to overcome a disadvantage, and weakness of the progressive separator set forth.

The applicant has found that instead of only the one slide adjacent the separator in the group to be projected being raised when a slide is inserted into the projected group, that two or more slides are elevated. This occurrence is due to the surface friction between the slides, and which surface friction is effected by the spring ears 15 on the partition 13 tending to force the slides of the group to be projected into surface contact. This surface contact cannot be eliminated, or reduced, to overcome this disadvantage because the slide against the separator must be forced against the rollers 24 in order to be raised thereby; and the force for pressing the adjacent slide against said rollers must be transmitted through the group of slides by the resiliency of the spring ears 15 on the partition 13. The tendency of one or more slides immediately adjacent the slide abutting the rollers 24 to be elevated with said first slide is clearly illustrated in Figs. 2 and 4, and it has been found that one or more of said slides are sufficiently elevated with said first slide as to be removed therewith when the same is pulled from the box by hand.

To overcome this disadvantage of the progressive separator applicant has invented the improvement therefor hereinafter clearly disclosed. Coming now to the present invention, a shield 30 is connected to the upper end of the separator by ears 30' thereon being screwed, or otherwise fastened, to the end walls 70 of the separator. As is clearly shown, this shield 30 extends transversely of the separator and is adapted to overhang a number of slides in the group of slides to be projected. While the shield 30 may be of any width so as to cover any number of slides of the group A, it has been found that it need overhang only so many slides as might tend to be raised by the elevation of one slide engaging the rollers 24. The shield 30 is so located relative to the straight wall 17 of the separator that its edge 31 will be spaced from this wall of the separator to provide an exit slot 32 for only one slide, that being the one slide immediately adjacent the separator in group A. The shield 30 is preferably spaced from the adjacent wall of the separator so as to provide an exit slot wide enough to accommodate the thickest slides which might be used, namely, transparencies bound in metal frames, or between two glass plates. By virtue of this shield, when a slide is inserted into the group B of slides the slide of group A directly engaged by the rollers 24 will be elevated through the exit slot 32; but any tendency for the two slides adjacent said first slide to be raised along therewith will be prevented by the shield 30 overhanging the same. The rear edge of the shield 30 may be turned up as shown at 33 so that this edge will freely ride over the edges of the slides in the box as the separator progresses therealong.

Cardboard slides, or transparencies bound between two pieces of thin cardboard, are very common, and these slides are very much thinner than the glass or metal-bound slides heretofore mentioned. In fact, these cardboard slides may be only one-third the thickness of the other slides so that if a separator having an exit slot 32 wide enough to accommodate the thicker slides were used therewith three of the cardboard slides could be elevated through the slot instead of only one as desired. This result is clearly shown in Fig. 4 wherein a separator is shown in conjunction with these thin slides above referred to.

Therefore, in order that a given progressive separator may be used with slides of varying thickness provision must be made for altering the width of the exit slot 32 in accordance with the thickness of different types of slides. To this end a supplementary shield, or slide, 35 is slidably mounted on the shield 30 to move across said exit slot. As clearly shown in Fig. 3 this slide may be provided with a pair of spaced parallel slots 36 engaging pins 37 extending upwardly from the shield 30. The slots 36 are inclined to the length of the slide so that a force applied longitudinally of the slide by gripping one of the projections 38 thereon will move the slide transversely of the exit slot 32 to effectively vary the width of said slot in accordance with the thickness of the slide to be used. Referring to Fig. 3, it will be noticed that the slide is so arranged on the shield 30 that when it is at one extreme of this adjustment the leading edge 39 thereof is flush with the edge 31 of the shield whereby the space between the shield and the adjacent wall of the separator provides an exit slot of a width sufficient to accommodate the thickest slide which might be encountered. The operation and effectiveness of the improvement in the progressive separator constituting the present invention will be clearly understood from an inspection of Figs. 2 and 4 where its use in connection with slides of two different thicknesses is clearly illustrated.

It is believed that the importance and effectiveness of the above disclosed improvement in the described progressive separator, and constituting the present invention, will be readily appreciated from the above description and the drawing. Its presence on the separator makes the separator function in the manner it was obviously intended to function, namely to elevate only one particular slide in the box to the return of a previously used slide, but which function the separator was incapable of without said improvement. In addition, it adapts the separator for use with slides of varying thickness thus eliminating the necessity of having an individual separator for use with each thickness of slide. The invention is relatively simple in construction, making it capable of being applied to any existing separator of the type set forth at little expense or trouble, but although it is simple in character and construction it overcomes a great disadvantage inherent in such a separator and makes the same function in a manner which is desirable.

Although I have shown and described certain specific embodiments of my invention, I am fully aware that many modifications thereof are possible. My invention, therefore, is not to be restricted except insofar as necessitated by the scope of the appended claims.

Having thus described my invention what I claim is new and desire to secure by Letters Patent of the United States is:

1. A progressive separator for use with a series of projection slides having a pre-arranged sequence and a container for said series of slides, said separator being adapted for disposition in said container to separate the series of slides into a group which are to be projected and another group which have been projected, said separator being formed adjacent its upper end to define a guide opening to said projected group, and means carried by said separator for elevating the next adjacent slide of the group to be projected upon insertion of a slide into said projected group adjacent the same, and means on said separator providing an exit slot through which the slide of the group to be projected and immediately adjacent the separator may be projected and preventing the elevation of any other slide of said group.

2. A progressive separator for use with a series of projection slides having a pre-arranged sequence and a container for said series of slides, said separator being adapted for disposition in said container to separate the series of slides into a group which are to be projected and another group which have been projected, said separator being formed adjacent its upper end to define a guide opening to said projected group, and means carried by said separator for elevating the next adjacent slide of the group to be projected upon insertion of a slide into said projected group adjacent the same, and a shield connected to, and extending transversely of, the upper end of said separator and adapted to overhang certain of the slides of the group of slides to be projected, a part of said shield being spaced from said separator proper to provide an exit slot for the one slide immediately adjacent the same.

3. A progressive separator for use with a series of projection slides having a pre-arranged sequence and a container for said series of slides, said separator being adapted for disposition in said container to separate the series of slides into a group which are to be projected and another group which have been projected, said separator being formed adjacent its upper end to define a guide opening to said projected group, and means carried by said separator for elevating the next adjacent slide of the group to be projected upon insertion of a slide into said projected group adjacent the same, a shield connected to, and extending transversely of, the upper end of said separator and adapted to overhang certain of the slides of the group of slides to be projected, a part of said shield being spaced from said separator proper to provide an exit slot for the one slide immediately adjacent the same and means for adjusting the width of said exit slot to accommodate projection slides of different thickness.

4. A progressive separator for use with a series of projection slides having a pre-arranged sequence and a container for said series of slides, said separator being adapted for disposition in said container to separate the series of slides into a group which are to be projected and another group which have been projected, said separator being formed adjacent its upper end to define a guide opening to said projected group, and means carried by said separator for elevating the next adjacent slide of the group to be projected upon insertion of a slide into said projected group adjacent the same, a shield connected to, and extending transversely of, the upper end of said separator and adapted to overhang certain of the slides of the group of slides to be projected, a part of said shield being spaced from said separator proper to provide an exit slot for the one slide immediately adjacent the same, a supplementary shield extending longitudinally of said first named shield and slidably mounted thereon to move relatively thereto and across said exit slot to vary the width of the same to accommodate slides of different thickness.

5. A progressive separator for use with a series of projection slides having a pre-arranged sequence and a container for said series of slides, said separator being adapted for disposition in said container to separate the series of slides into a group which are to be projected and another group which have been projected, said separator being formed adjacent its upper end to define a guide opening to said projected group, and means carried by said separator for elevating the next adjacent slide of the group to be projected upon insertion of a slide into said projected group adjacent the same, a shield connected to, and extending transversely of, the upper end of said separator and adapted to overhang certain of the slides of the group of slides to be projected, a part of said shield being spaced from said separator proper to provide an exit slot for the one slide immediately adjacent the same and means for adjusting the width of said exit slot to accommodate projection slides of different thickness, said means comprising a slide extending longitudinally of said shield and provided with two spaced parallel slots inclined to the length of said exit slot and engaging spaced pins on said shield, whereby a force longitudinally of said slide is adapted to move the same parallel to, and laterally of, said exit slot to vary the width of the same.

HENRY J. HOOD.